(12) United States Patent
Muthaiah et al.

(10) Patent No.: US 8,314,718 B2
(45) Date of Patent: Nov. 20, 2012

(54) REDUCING THE COMPUTATIONAL LOAD ON PROCESSORS BY SELECTIVELY DISCARDING DATA IN VEHICULAR NETWORKS

(75) Inventors: Skanda N Muthaiah, Bangalore (IN); Rajeev Shorey, New Delhi (IN)

(73) Assignee: GM Global Technology Operations LLC, Detroit, MI (US)

( * ) Notice: Subject to any disclaimer, the term of this patent is extended or adjusted under 35 U.S.C. 154(b) by 596 days.

(21) Appl. No.: 12/572,514

(22) Filed: Oct. 2, 2009

(65) Prior Publication Data
US 2011/0080302 A1  Apr. 7, 2011

(51) Int. Cl.
*G08G 1/16* (2006.01)
(52) U.S. Cl. .................. 340/903; 340/426.24; 340/691.1
(58) Field of Classification Search .................. 340/903, 340/438, 425.5, 426.24, 988–991, 901–902, 340/5.2, 934, 933, 436, 426.18, 691.1
See application file for complete search history.

(56) References Cited

U.S. PATENT DOCUMENTS

| | | | | |
|---|---|---|---|---|
| 5,182,555 A | * | 1/1993 | Sumner | 340/905 |
| 5,365,516 A | * | 11/1994 | Jandrell | 370/335 |
| 6,163,750 A | * | 12/2000 | Nojima | 701/443 |
| 6,930,604 B2 | * | 8/2005 | Marino | 340/539.16 |
| 7,593,999 B2 | * | 9/2009 | Nathanson | 709/217 |
| 2007/0198140 A1 | * | 8/2007 | Mudalige | 701/1 |

* cited by examiner

*Primary Examiner* — Daniel Previl (57) ABSTRACT

A method is provided for efficiently processing messages staged for authentication in a security layer of a protocol stack in a wireless vehicle-to-vehicle communication system. The vehicle-to-vehicle communication system includes a host vehicle receiver for receiving messages transmitted by one or more remote vehicles. The host receiver is configured to authenticate received messages in a security layer of a protocol stack. A wireless message broadcast by a remote vehicle is received. The wireless message contains characteristic data of the remote vehicle. The characteristic data is analyzed for determining whether the wireless message is in compliance with a predetermined parameter of the host vehicle. The wireless message is discarded prior to a transfer of the wireless message to the security layer in response to a determination that the wireless message is not in compliance with the predetermined parameter of the host vehicle. Otherwise, the wireless message is transferred to the security layer.

18 Claims, 4 Drawing Sheets

| Characteristic Data | Description |
|---|---|
| $(x, y, z)$ | Location coordinates that indicate the position of a vehicle |
| $T$ | Time at which data packet was generated |
| $(v, a)$ | Velocity and Acceleration of the vehicle |
| $\theta$ | Direction of motion of the transmitting vehicle |
| $SINR$ | Signal-Interference-Noise-Ratio of the received data packet |
| $P$ | Transmission Power used |
| $RSSI$ | Received Signal Strength Indicator |
| $Signature$ | Signature of the data packet |
| $AoA$ | Angle-of-Arrival of the incoming data packet |
| $Nonce$ | The random number that accompanies each packet |
| $TID$ | Transmitter ID |

REDUCING THE COMPUTATIONAL LOAD ON PROCESSORS BY SELECTIVELY DISCARDING DATA IN VEHICULAR NETWORKS

BACKGROUND OF INVENTION

An embodiment relates generally to vehicle-to-vehicle communications.

Vehicle-to-vehicle (V2V) applications relate to co-operative communications for a vehicle based on two-way communications for interacting in real time. These systems are preferably directed to traffic management, collision warning, and collision avoidance. Such systems can extend a host vehicle's range of awareness of surrounding environmental conditions by providing relevant information regarding the status of traffic in addition to any safety related events occurring in proximity to or detected by vehicles near the host vehicle.

A substantial cost is involved in incorporating security protection regards to V2V applications. The cost incurred is that of the computational power required to process security, specifically (1) for creating a secure message at the transmitter and (2) to verify the integrity of this secure message at a receiving node. The information exchanged between the vehicles in V2V communications must be secured to prevent a malicious user from hacking into the communication system and presenting false data which disrupts the V2V application service.

Messages in V2V communications are secured by appending a unique digital signature to the message. The digital signatures are typically based on asymmetric key cryptography and are the digital equivalent of hand-written signatures. At the receiving end of a vehicle communication, a digital signature algorithm is used to verify the signature. If a digital signature is authenticated, the messages are transferred to the application layer for processing the data with the message.

Verifying the message using a digital signature algorithm is based on a variety of mathematically intensive algorithms. The use of such algorithms is computationally intensive owing to an enormous number of mathematical computations such as multiplications, squaring, and inversions that need to be accomplished for every signature to be generated or verified. The use of processors within a vehicle communication systems such as those used in Vehicle Computing Platforms that cater to CAN and LIN buses and Flexible Computing Platforms that cater to Bluetooth and USB communication mediums are not designed to handle computational intense operations. As an alternative, an ASIC/FPGA (Application Specific Integrated Circuit/Field Programmable Gate Array) can be used to perform the digital signature authentication can be used. The cost of such hardware for these standalone processors removes the computational bottleneck that typically occurs with standard computing processors; however, the cost is undesirably high.

SUMMARY OF INVENTION

An advantage of an embodiment of the invention provides for a reduced number of data packets that are provided to a security layer in response to filtering data packets to remove any that are from a vehicle determined not to be within the same road of travel as the host vehicle or from vehicles where malicious node tampering is has been detected. The filtering process lessens the computational load of the security packet and reduces bottlenecks.

An embodiment of the invention contemplates a method for efficiently processing messages staged for authentication in a security layer of a protocol stack in a wireless vehicle-to-vehicle communication system. The vehicle-to-vehicle communication system includes a host vehicle receiver for receiving messages transmitted by one or more remote vehicles. The host receiver is configured to authenticate received messages in a security layer of a protocol stack. A wireless message broadcast by a remote vehicle is received. The wireless message contains characteristic data of the remote vehicle. The characteristic data of the remote vehicle is analyzed for determining whether the wireless message transmitted by the remote vehicle is in compliance with a predetermined parameter of the host vehicle. The wireless message is discarded prior to a transfer of the wireless message to the security layer in response to a determination that the wireless message transmitted by the remote vehicle is not in compliance with the predetermined parameter of the host vehicle. Otherwise, the wireless message is sent to the security layer.

An embodiment of the invention contemplates a vehicle-to-vehicle communication system for efficiently processing messages staged for authentication in a security layer of the protocol stack. The vehicle-to-vehicle communication system includes a receiver for receiving incoming messages from remote vehicles. A processing unit within the receiver processes the incoming messages received by the receiver of a host vehicle. A protocol stack for executes a protocol for processing the received messages. The protocol stack includes the security layer for authenticating a digital signature of the received message. A filter selectively processes a number of messages being staged for authentication in a security layer of the protocol stack. The filter discards respective wireless messages prior to a transfer of the respective wireless message to the security layer in response to a determination that the wireless message transmitted by the remote vehicle is not in compliance with a predetermined parameter of the host vehicle.

DETAILED DESCRIPTION

Figure 1:
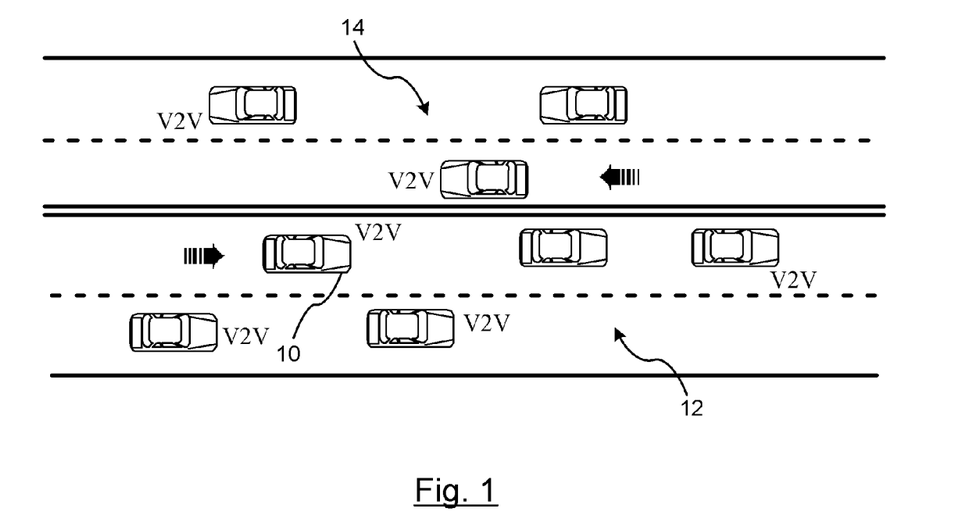
FIG. 1 is an illustration of vehicle traversing along a vehicle road according to an embodiment.

There is shown generally in FIG. 1 a traffic flow diagram illustrating a host vehicle 10 and a plurality of remote vehicles 12 traveling in a same direction. A plurality of oncoming remote vehicles 14 travel along an opposite side of the road in an opposing direction. Many of the vehicles traveling in the same direction and the opposing direction have communication capabilities with the host vehicle 10 known as vehicle-to-vehicle (V2V) messaging. The host vehicle 10 and those respective remote vehicles 12 that have communication capabilities periodically broadcast wireless messages to one another over a respective inter-vehicle communication network.

V2V wireless messages communicated between the vehicles may be transmitted as a standard periodic beacon message that includes data regarding environmental awareness conditions relating to vehicle positions, vehicle kinematics/dynamic parameters, traffic or road events sensed by each respective vehicle. Such environmental awareness conditions are communicated between vehicles over the inter-vehicle communication network to forewarn of some type of safety condition, traffic delays, accident, or other current conditions that is of potential importance to a driver of the vehicle or the a safety related system of the vehicle. One of the objectives is to provide advance warning to neighboring vehicles of a condition so as to provide additional time to react to the condition. Such warnings for environmental awareness conditions may include, but are not limited to, traffic congestion, accidents, forward collision warnings (FCW) in effect in the transmitting vehicle, lateral collision warning (LCW), lane departure warning (LDW), slow/stopped vehicles ahead, emergency electronic brake light activation (EEBL), rear end central high mounted stop light (CHMSL) activation, stopped vehicle alert (SVA), intersection collision warning/avoidance, straight crossing path, working zone warning, blind spot/lane change, and visibility enhancement of pedestrians/cyclists. As can inferred from FIG. 1, the host vehicle will receive messages from each of the vehicle within broadcast range of the host vehicle that includes vehicles within a multi-lane road traveling the same direction in addition to vehicles traveling in an opposite direction. Moreover, a host vehicle could received broadcast messages from other vehicles in a multi-level interchange whereas four or more levels of road intersect one another or are situated where vehicles are capable of receiving broadcast messages between the closely proximate yet segregated interchange ramps.

Figure 2:
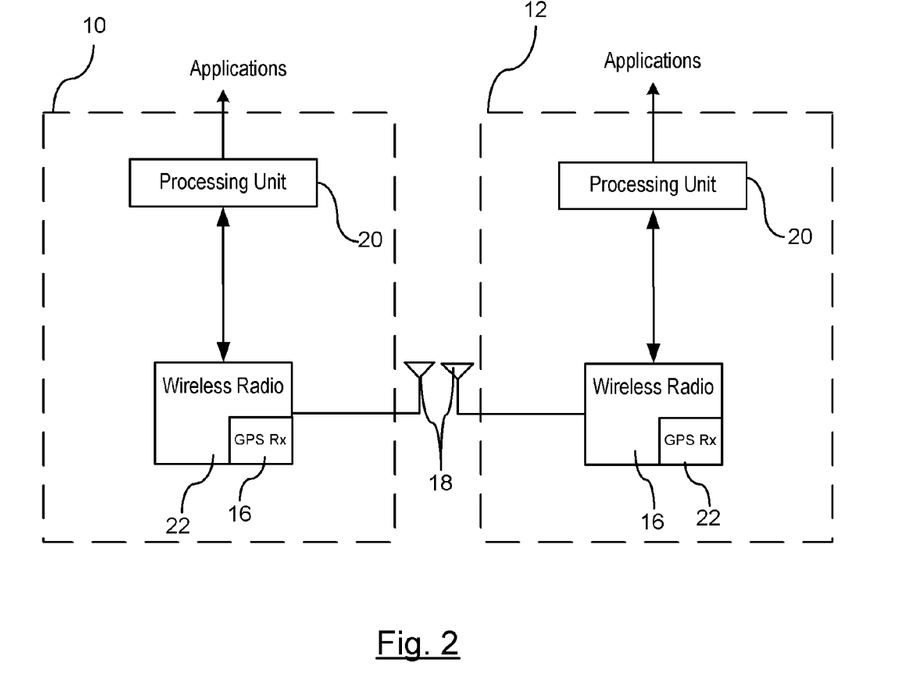
FIG. 2 illustrates a system architecture for respective vehicles of the vehicle receiver of a vehicle-to-vehicle communication system.

FIG. 2 illustrates the system architecture for the host vehicle receiver 10 and a respective remote vehicle receiver 12. The host vehicle receiver 10 and the respective remote vehicle receiver 12 are each equipped with a wireless radio 16 (e.g., rear end of a receiver) that includes a transmitter and a receiver (or transceiver) for broadcasting and receiving the wireless messages via an antenna 18. The host vehicle receiver 10 and respective remote vehicle 12 further include respective processing units 20 (e.g., protocol stack) for processing the data received in the wireless message or other transmitting devices such as a global positioning system (GPS) receiver 22. Alternatively, the wireless radio may also function as a GPS receiver.

A GPS utilizes a constellation of satellites that transmit signals which enable the GPS receiver 22 of a respective vehicle to determine its location, speed, direction, and time. GPS data for a respective vehicle of the V2V communication network is broadcast as part of the wireless message for identifying the location of the transmitting vehicle. This allows the respective processing unit 20 of the host vehicle receiver 10 to evaluate the message contents in light of the remote vehicle's position for assessing the relevance of a respective condition to the host vehicle receiver 10.

For a receiver of a respective host vehicle, the receiver has to authenticate a large number of data packets due to simultaneous multiple transmissions from other vehicles in the surrounding region. For a respective multi-lane road, or multi-level highway interchange, each vehicle having V2V communication capability transmits a message approximately every 100 msec. As a result, the number of messages received by the host vehicle increases exponentially, even as the density of the remote vehicles increase linearly. Therefore, the number of messages that must be processed could be as high as 800-1200 messages per minute. This number may increase in the presence of malicious node tampering. Malicious node tampering is scenario where the communication system is manipulated in a way that is not in the best interest of what V2V communication system is designed for. Malicious node tampering involves the falsifying or masquerading of a single user by falsifying data. The intent is to confuse receivers by manifesting itself as multiple senders to give the impression that the signal is being sent by multiple sources. How this is carried out is that nodes generate data packets with incorrect data, possibly forged digital signatures. The V2V communication system is flooded with these packets leading to high packet collision lost at the physical layer, higher buffer loss at the security layer, and the distribution of incorrect data to the application layer. The accumulative affect of legitimate V2V communications and malicious node tampering places extensive strain on the host vehicle's processing unit. The strain is more than the standard processors within a receiving unit can handle. The use of a dedicated processor such as an ASIC or FPGA would be required to handle such a bottleneck of messages. Furthermore, the verification of a digital signature at the receiving end is more computationally expensive than placing a digital signature on the message at the transmitting end. For example, in the use of Elliptic Curve Cryptography (ECC) for digital signatures, the ECC algorithm requires on average of 31 mec for signing a message and 38 msec for verifying the same message. Coupled with the task that the receiver has to process several hundreds of messages in resource-constrained environments, the task of alleviating the bottleneck of processing the messages would typically be accomplished through the use of hardware (e.g., ASIC's) or software.

ASIC's as described earlier is a dedicated processor that is designed specific for an application. Hence, efficient implementations can be designed at a system level which frees up the main processor from security related processing leaving the main processor free to carry out other tasks more efficiently, but comes with the added cost of the processor. Software algorithms are implements using a set of primitive or foundation operations. These primitive operations define functions to implement multiplications, squaring, and inventions on large numbers ($>10^{19}$ bits). Although these algorithms use well defined mathematical rules that are robust to both brute-force attacks and crypt-analysis, the amount of information to perform computational analysis is time consuming.

Figure 3:
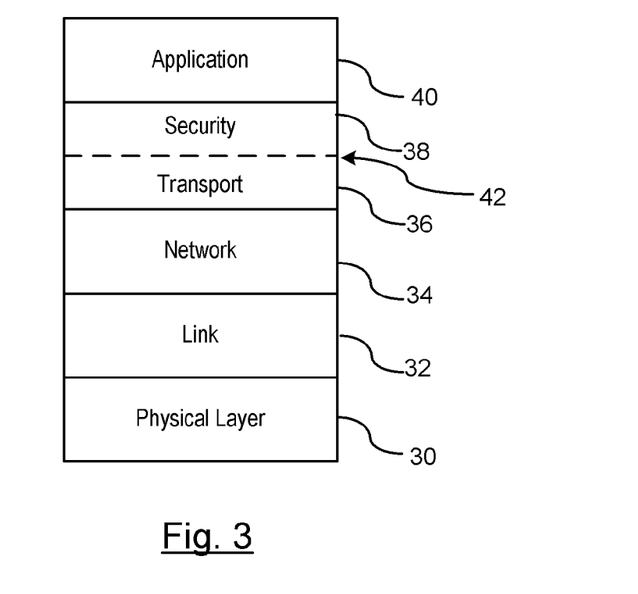
FIG. 3 illustrates a prior art protocol stack used in vehicle-to-vehicle communications.

FIG. 3 illustrates a protocol stack for V2V communications. A typical protocol stack includes various layers, namely, a physical layer 30, a link layer 32, a network layer 34, a security layer 38, and an application layer 40. The transport layer 36 is responsible for delivering data to an appropriate application within the vehicle. The security layer 38 is an artificial layer that exists below the application layer 40 but above the transport layer 40. Security algorithms are implemented in this layer. The security layer 38 allows the data packets to be communicated across the network in a manner that prevents eavesdropping, tampering, and message forgery. The security layer 38 authenticates the message (e.g., data packet) and communicates the data over the network using cryptology. The security layer 38 authenticates the digital signature of the data packet. It is at this stage in current V2V communications where bottlenecks occur given the vast amount of messages received and the time the transport security layer takes to authenticate the data packet.

A filter is shown generally at 42, and is implemented to efficiently reduce the number of data packets provided to the security layer 38. The filter 42 exists as a set of algorithms which examines each data packet prior to the security layer 38 and makes a decision to send the data packet to the security layer 38 or discard the data packet. The filter 42 does not violate any standards and can exist independent of any standard that the V2V communication process utilizes. The filter 42 uses characteristic data either provided directly in the data packet or is derived from the data of the data packet. The characteristic data is compared to predetermined parameters as determined by the host vehicle. Data used to generate the predetermined parameters may be collected by a vehicle interface device 24 (shown in FIG. 2) of the host vehicle. Examples of data collected by the vehicle interface device that is used for determining the predetermined parameters may include, but is not limited to, GPS data, speed, velocity, acceleration, and steering angle data, which assist in determining a position or trajectory of the host vehicle relative to the remote vehicles. It should be understood that the filter 42 functions as a pre-security processing routine to filter and discard unwanted V2V communication messages. The filter may use a plurality of filter stages to analyze and discard the data packets received by a vehicle in a V2V network. It should further be understood that the characteristic data and predetermined parameters as described herein for filtering is not exhaustive and that the filtering routine may utilize various characteristic data and predetermined parameters that will identify an unwanted filter packets for discarding the filter packet.

Figure 4:
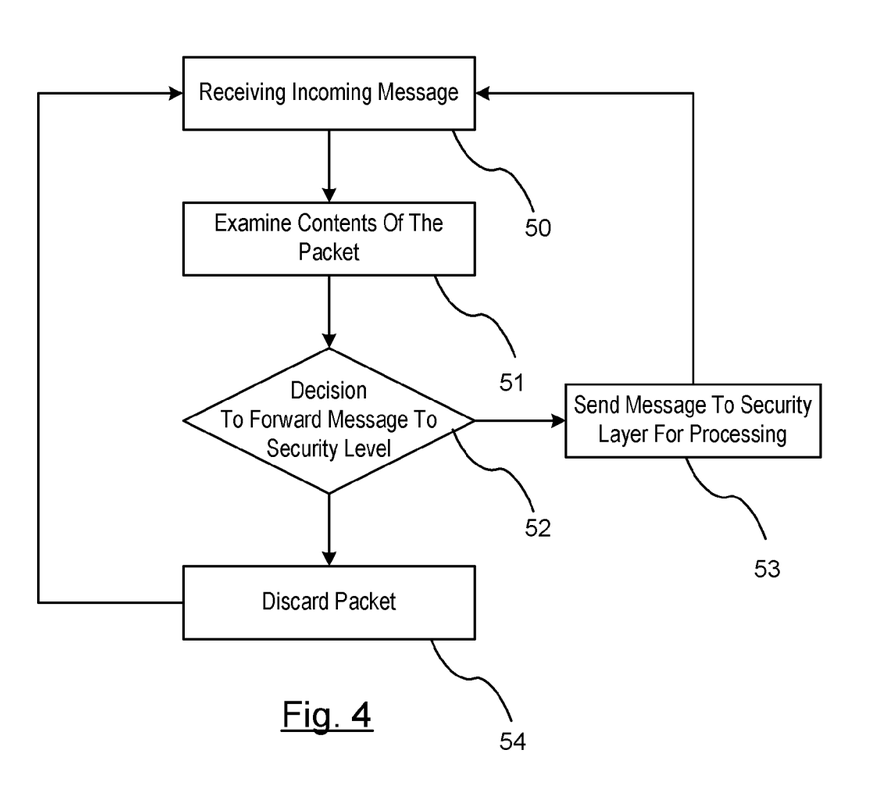
FIGS. 4-5 illustrate flowcharts of methods illustrating data packet filtration according to the preferred embodiment of the invention.

FIG. 4 illustrates a flowchart illustrating a general concept for determining whether to discard a received data packet. In step 50, the receiver of the vehicle receives a data packet. In step 51, contents of the data packet are examined prior to checking the digital signature of the data packet. In step 52, a filtering decision is made by comparing characteristic data of the received data packet to the predetermined parameter set by the host vehicle. Characteristic data may be obtained directly from the data packet without additional processing or may be derived using the data and other contents within the data packet. The predetermined parameter may include, but is not limited to, a comparable parameter of the host vehicle for determining positional data or attitude data of the host vehicle or may include a parameter relating to spurious data of the transmitted message such as malicious node tampering. The predetermined parameter may be a condition that is determined as a function of the collected information as described above or may be a condition or standard that is previously established and does not required derivation based on collected data of the host vehicle. In step 53, if the information within the data packets is in compliance with the predetermined parameter, then the data packet is transferred to the security layer for authentication of the data packet. In step 54, if the information within the data packet does is not in compliance with the predetermined parameter, then the data packet is discarded.

Figure 5:
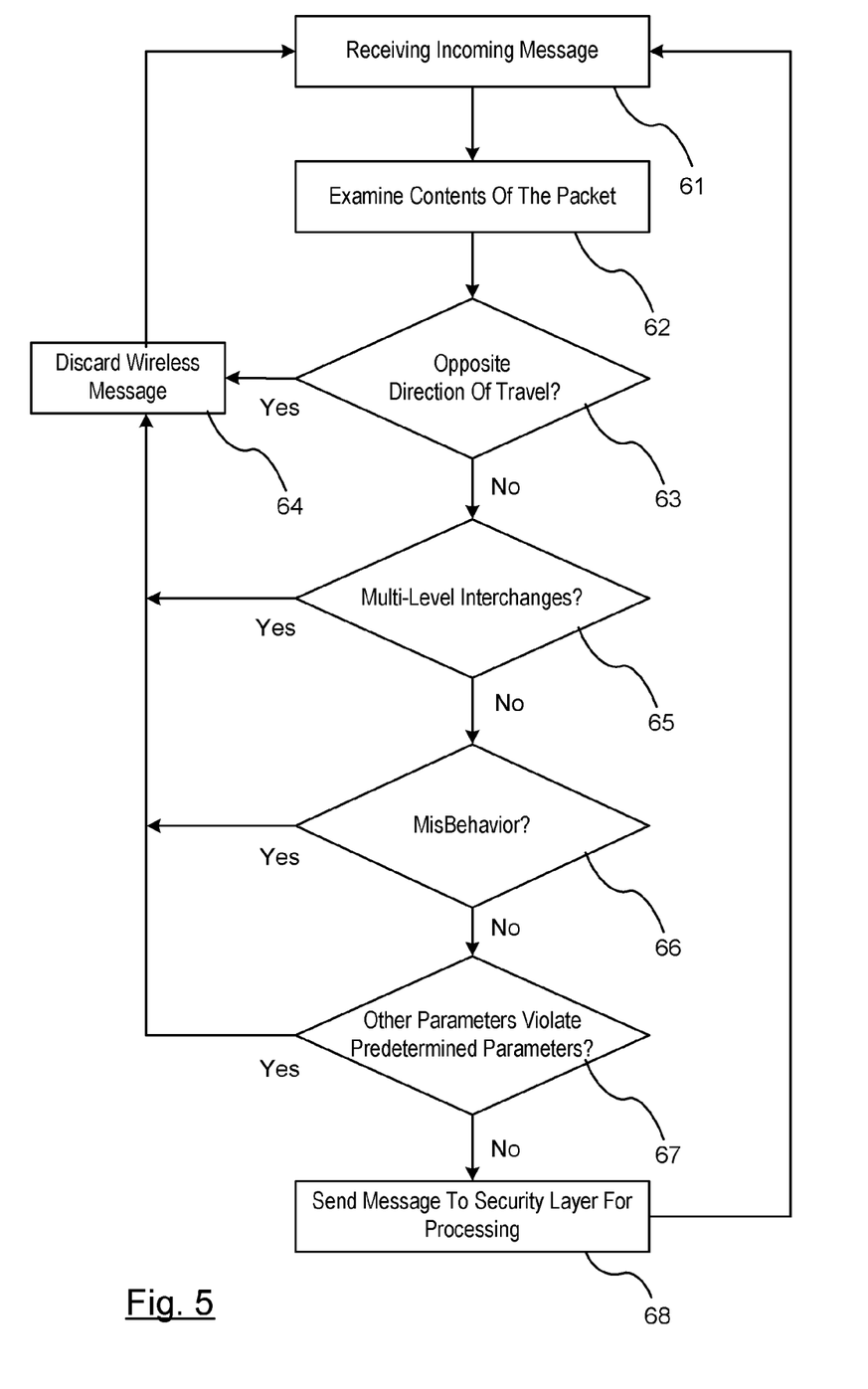
Figure 6:
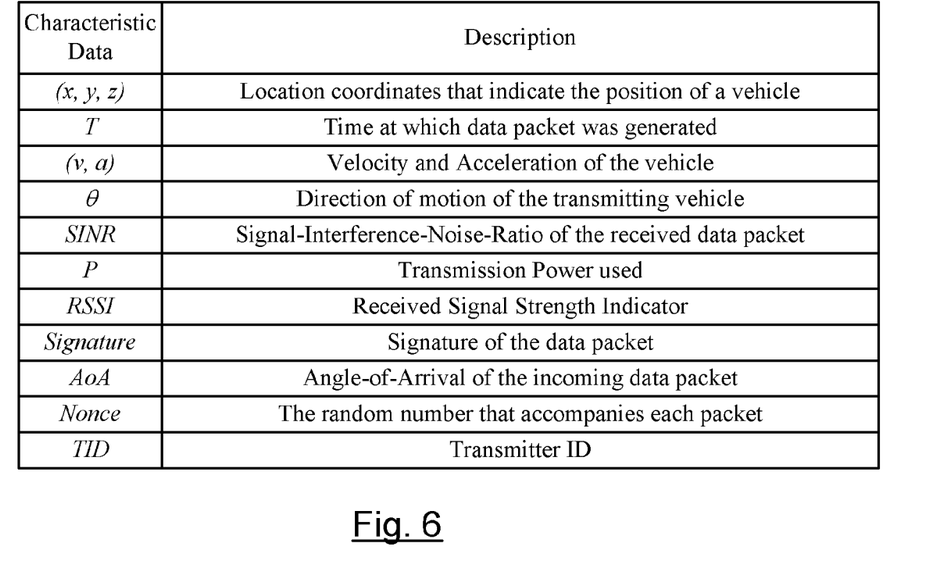
FIG. 6 is a table listing examples of characteristic data.

FIG. 5 illustrates a flowchart providing a detailed description of the filtering process. In step 61, the receiver of the vehicle receives a message from a remote vehicle in a V2V communication network. The message includes a data packet containing information as described earlier. In step 62, contents of the data packet are examined prior to authenticating the digital signature of the data packet. The examination of the characteristic data is used to determine whether the data packet contains information that is not beneficial to the host vehicle (e.g., whether the data packet indicates that the message will directly affect the travel of the host vehicle or whether the data message contributes to spuriousness that either erroneously or maliciously provides incorrect information in V2V communications). Characteristic data contained in the data packet that may be used in determining whether the data packet is beneficial or not beneficial to the host vehicle includes, but is not limited to, global positioning data, altitude data, remote vehicle velocity, acceleration, trajectory, direction of travel, signal strength, time of transmission of the signal, signatures, signal quality, receiver sensitivity, and signal to noise interference ratio. The table in FIG. 6 illustrates some example characteristic data that may be used in determining whether the data packet should be discarded. The above information is either directly compared to a predetermined parameter or may require further processing for configuring the data to be compared to predetermined parameters which will be discussed in the following steps.

In step 63, a direction of travel of the remote vehicle transmitting the message is compared to the host vehicle's direction of travel. As described earlier, V2V communications are provided to alert a host vehicle of occurrences of some event that has an affect on the host vehicle. Messages such as EEBL and SVA which are received from remote vehicles that relate to events occurring in the opposite direction of travel do not affect the host vehicle. As a result, such messages can be discarded. Therefore, the host vehicle can determine the direction of travel of the remote vehicle transmitting the data message based on the GPS data contained in the data message. V2V packets have position coordinates stamped as part of the data message and analyzing this information within the data packet provides the necessary information to make a valid decision. The direction of travel (e.g., direction of transit) may be determined by a plurality of methods and such methods are not limited to only those embodiments described herein. Determination of travel may be performed utilizing a GPS system. GPS receivers determine a direction of travel along a location of coordinates. If such information is part of the transmitted V2V data packet, then each receiving node can infer the direction of travel directly from the transmitted message. If such information is not part of the transmitted V2V data packet, the direction of travel for a remote vehicle can be determined by simple extrapolation of the earlier points of travel by the remote vehicle.

A more complex way of determining the direction of travel includes measuring an angle-of-arrival (AoA) of the transmitted packet at the receiver. AoA involves measuring the time difference of arrival at individual elements of a receiver antenna array and computing a direction of incidence based on delays encountered at each of the individuation antenna array elements. Since array elements are equi-spaced in multiples (integer or fractional) of wavelengths, the delay between array elements is a representative of the direction of wave propagation.

Once the direction of travel is determined, a comparison is made with the current vehicles direction of travel. If any of the V2V applications of the host vehicle do not require information from remote vehicles traveling in the opposing direction and road conditions ensure that opposing traffic will not bear any influence on the current driving conditions, then a decision to discard the data packet can be made based on the comparison to the predetermined parameter. It should be understood that the methods other than those described herein for determining direction of travel by the vehicle transmitting the message may be used without deviating from the scope of the invention.

In step 63, if the data within the data packet indicates that the direction of travel of the remote vehicle is not in the direction that the host vehicle is traveling, then the routine proceeds to step 64 where the message is discarded. The routine then proceeds to step 61 to receive and analyze a next message. In step 63, if the data within the data packet indicates that the direction of travel of the remote vehicle is in a same direction that the host vehicle is traveling, then the routing proceeds to step 65.

In step 65, the altitude of the remote vehicle is compared to the altitude of the host vehicle. This is performed due to multi-level interchanges where although the remote vehicle and host vehicle may be in close proximity to one another and traveling is a substantially same direction, the respective vehicles may be on different levels of the interchange, and therefore, events occurring in the remote vehicle path of travel may not affect the host vehicle. The altitude may be determined by various methods. For example, a GPS is capable of providing in the horizontal and vertical sector up to a respective resolution. Although GPS's may have poor lateral resolution, GPS in cooperation with other technologies such as embedded navigation can be used in tandem to determine the altitude within permissible error limits. Embedded Navigation includes intelligent algorithms that constantly reference a map (e.g., an existing database) to determine the altitude of the vehicle. Another alternative for determining the altitude is the use of atmospheric pressure sensors. Atmospheric pressure sensors provide the greatest resolutions at low to moderate cost. These sensors determine the altitude by measuring the relative variation of the atmospheric pressure. In yet another alternative for determining the altitude is the use of the signal-to-interference-plus-noise ratio (SINR). For vehicles placed at different levels (i.e., altitudes), the SINR at the host vehicle (i.e., receiving vehicle) varies greatly. For vehicles on a same level, communication is almost entirely affected by line-of-sight or multi-path signals providing the best SINR. For those respective vehicles on different levels, the signal undergoes a rapid attenuation in response to the presence of concrete and the SINR at the receiving vehicle greatly varies. Therefore, measuring these signals serves as an indicator of the respective vehicles being on different levels. It should be understood that methods other than those described herein for determining the altitude of the remote vehicle may be used without deviating from the scope of the invention.

In step 65, a determination is made whether the altitude of the host vehicle is different from the altitude of the remote vehicle. If determination is made that the altitude of the remote vehicle is different than the altitude of the host vehicle, then the routine proceeds to 64 where the data packet is discarded. If the altitude of the remote vehicle is substantially the same as the altitude of the host vehicle, then the routine proceeds to step 66.

In step 66, a determination is made whether any spurious information is present based on known physical laws. Spurious data in V2V communication networks may be due to faulty equipment or malicious node tampering. Spuriousness due to faulty equipment may be the result of, but is not limited to, a malfunctioning sensor in a vehicle resulting in incorrect information about the environment being reported to the host vehicle (e.g., oil spill on a road not being reported due to faulty sensors). Spuriousness due to maliciousness includes malicious users intentionally compromising the V2V communication system for various reasons. For example, a false stopped vehicle alert (SVA) signal broadcast by malicious users to other drivers might be done to cause an accident. Identifying such behaviors is a non-trivial issue and often cannot be determined just by the examination of the contents of the data packet.

Various methods may be used to detect spurious content within the data message. The following methods are exemplary of how spuriousness can be detected and is not meant to be an exhaustive list of the ways spurious content is detected. A first method includes determining a uniqueness of a nonce. The nonce is a unique number that is used exactly once in a given protocol. Each data packet broadcast in a V2V communication network has a nonce embedded in the data packet. A repetition of nonce indicates spuriousness and the filter must ensure that only data packets with nonce that are less than or equal to the previously obtained nonce are accepted.

A second example is determining an integrity of the signature. A simplest form of attack is a computational denial of service attack. Since verifying asymmetric key cryptography based on signatures is computationally intensive, verifying a large number of signatures can severally degrade a performance of the V2V communication network. A malicious attacker of the system just has to append 256-bits of random number to each transmitted message. As a result, the filter must ensure that the data packets with random bits of data masquerading as signatures are filtered from signatures with correct signatures.

A third example includes certificate revocation lists (CRLs). Revoking misbehaving nodes is performed through CRLs which are disseminated periodically or in response to particular events to all participants of the V2V communication network. CRLs are essentially lists that identify misbehaving nodes through a unique ID. If a node ID exists in the CRLs, the data packets received from the node ID are discarded.

Figure 7:
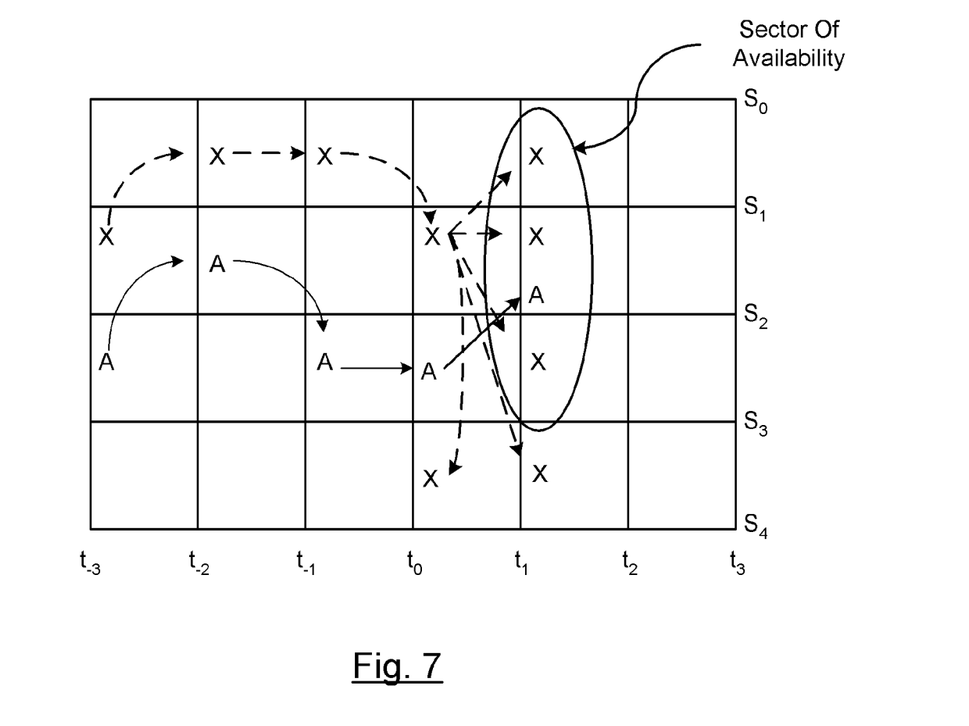
FIG. 7 illustrates sector of availability graph of a remote vehicle tracking routine.

A fourth example for determining malicious behavior is by examining whether the broadcast message is consistent with physical laws. Such attacks are known as spoofing. Spoofing is a type of computational denial of service attack where a single radio transceiver transmits messages with multiple IDs stamped in the messages giving the impression that these respective packets are originating from multiple radio transceivers or multiple vehicles. That is, for a remote vehicle traveling within a vicinity of the host vehicle, the trajectory, velocity, and acceleration must be consistent with known physical laws. If the vehicle appears to jump around or be out of sync of what is expected based on the traveling attributes of the vehicle, then a determination may be that malicious node tampering is present. Malicious node tampering may be determined by establishing a sector of availability for the remote vehicle meaning that as a vehicle travels along a trajectory at a given velocity or acceleration, successive location points (as plotted on time versus space graph) should provide a smooth movement of the trajectory. An automobile trajectory is carried out in both a temporal and a spatial domain. Given the traveling characteristics of the vehicle, an algorithm can predict or construct a sector of availability of the remote vehicle at a time t+Δ. The sector of availability can be constructed using the following equations:

$$v = u + at$$

$$v^2 = u^2 + 2as$$

where v is the final velocity, a is the acceleration, u is the initially velocity, and s is the distance traveled of the remote vehicle. FIG. 7 illustrates a sector of availability graph illustrating the detection of the spoofing concept. Each vehicle within the sector graph transmits a message by node which has a "location coordinate" as part of the message. A detection scheme involves tracking these location coordinates and flagging them for spuriousness if the trajectory appears inconsistent with known physical laws. In FIG. 7, vehicle X is the transmitting vehicle and vehicle A is the receiving vehicle. The road is divided into a sequence of equal spaced blocks in the spatio-temporal domain. At $t_{-3}$, vehicle A starts to track vehicle X. At time $t_0$, vehicle A has sufficient data based on vehicle x's speed, acceleration, driving behavior to predict that vehicle x will be in a designated "sector of availability". If location coordinate of vehicle x at time $t_0$ is out of this "sector of availability", then the behavior of vehicle x can be considered malicious.

A fifth example of spurious detection within the data message is based on conformity to signal propagation. Wireless signal propagation characteristics can be employed to determine spuriousness. SINR and RSSI that can be obtained from a received packet at the physical layer of a receiving node. Utilizing these characteristics, the approximate relative distance between the transmitting and receiving nodes are obtained. SINR, in addition to signal strength and other signal quality characteristics may be compared to one or more threshold parameter ranges for determining whether malicious node tampering is present. For example, the signal strength of a wireless signal falls exponentially with distance. If the signal is losing signal strength, then a determination may be that the signal thought to be broadcast from a remote vehicle in the near vicinity and same direction of the host vehicle may not be near the host vehicle as expected. It is also well understood that SINR decreases as the range between the transmitter and receiver increases. If the SINR is too low (i.e., lower than a predetermined threshold range), then the data packet may be suspect and discarded. Alternatively, if the SINR is too high (i.e., above the predetermined threshold range), then the data packet may be suspect and discarded. Various signal strength and signal quality measurements may be utilized to determine whether to discard a data packet from a remote vehicle. In summary, if the information related to inter-vehicle separation is in disagreement with the location coordinates broadcasted by the transmitting node, then packets from the transmitting node can be flagged for spuriousness and discarded.

If a determination is made in step 66 that the remote vehicle falls outside of the determined sector of availability, then malicious node tampering can be inferred and the routine proceeds to step 64 where the data packet is discarded. If the determination is made in step 66 that the remote vehicle is within the sector of availability, then the routine proceeds to step 67.

In step 67, various other characteristics (e.g., power) may be analyzed to determine whether to discard a data packet. Additional characteristic data may be measured, recorded, or computed for determining whether to discard a respective data packet during this filtering stage. If the characteristic data is not in compliance with the predetermined parameter for which it is being evaluated, then the data packet is discarded in step 64. If the characteristic data being evaluated is within the predetermined parameter range, then the routine proceeds to step 68.

In step 68, the data packet is transferred to the security layer to authenticate the digital signature of the respective data packet. The filtering routine illustrated in FIG. 5 is only one embodiment of how the filtering process may be executed. For example, FIG. 5 illustrates a method where each of the parameters being evaluated in performed serially, while it should be understood that the evaluation of each of the parameters in steps 63-67 may be executed in a different order or may be executed parallel to one another to reduce computation time.

It can be readily understood that the advantage provides for a reduced number of data packets provided to security layer by filtering those data packets that are either unnecessary in enhancing V2V communications between the vehicles or involve spuriousness whether intentionally or by error. The filtering process lessens the computational load of the security packet and reduces bottlenecks. The embodiments of the invention as described herein can be implemented as software, thereby not requiring the additional cost that would be otherwise required for stand alone processors. Moreover, the cross-layer does not violate any standards and exists independent of any standard the V2V communication system utilizes.

While certain embodiments of the present invention have been described in detail, those familiar with the art to which this invention relates will recognize various alternative designs and embodiments for practicing the invention as defined by the following claims.

What is claimed is:

1. A method for efficiently processing messages staged for authentication in a security layer of a protocol stack in a wireless vehicle-to-vehicle communication system, the vehicle-to-vehicle communication system including a host vehicle receiver for receiving messages transmitted by one or more remote vehicles, the host receiver being configured to authenticate received messages in a security layer of a protocol stack, the method comprising the steps of:

receiving a wireless message broadcast by a remote vehicle, the wireless message containing characteristic data of the remote vehicle;

analyzing the characteristic data of the remote vehicle for determining whether the wireless message transmitted by the remote vehicle is in compliance with a predetermined parameter of the host vehicle; and discarding the wireless message prior to a transfer of the wireless message to the security layer in response to a determination that the wireless message transmitted by the remote vehicle is not in compliance with the predetermined parameter of the host vehicle, otherwise transferring the wireless message to the security layer.

2. The method of claim 1 wherein characteristic data includes positional characteristic data of the remote vehicle and the predetermined parameter includes a path of travel of the host vehicle, wherein the positional characteristic data of the remote vehicle is compared to positional characteristic data of the host vehicle for determining whether the wireless message transmitted by the remote vehicle affects the path of travel of the host vehicle.

3. The method of claim 2 wherein the step of comparing the positional characteristic data between the remote vehicle and the host vehicle includes the step of comparing the trajectory of the remote vehicle with the trajectory of the host vehicle for determining whether the host vehicle and the remote vehicle are traveling in a same direction.

4. The method of claim 2 wherein the step of comparing the positional characteristic data between the remote vehicle and the host vehicle further includes the step of comparing the altitude of the remote vehicle with the altitude of the host vehicle for determining whether the host vehicle and the remote vehicle are traveling in substantially a same plane.

5. The method of claim 4 wherein the altitude of the remote vehicle is determined by a GPS receiver.

6. The method of claim 4 wherein the altitude of the remote vehicle is determined by a cooperation of a GPS receiver and an embedded navigation map.

7. The method of claim 4 wherein the altitude of the remote vehicle is determined by an atmospheric pressure sensor.

8. The method of claim 1 wherein the characteristic data is used to determine spuriousness of the wireless message, wherein the spuriousness corresponds to a respective wireless message containing false data.

9. The method of claim 8 wherein the characteristic data of the wireless message is used to determine malicious node tampering of the wireless message.

10. The method of claim 8 wherein the characteristic data of the wireless message is used to determine whether the data is obtained by faulty equipment.

11. The method of claim 9 wherein the characteristic data includes positional characteristic data and vehicle dynamic data of the remote vehicle, the method further comprising the steps of:
retrieving remote vehicle dynamic data from the wireless message;
constructing a previous path of travel of the remote vehicle based on previous received messages from the remote vehicle;
estimating at least one next potential segment of the path of travel that the remote vehicle may transition to based on the vehicle dynamic data within the wireless message;
determining if the position of the remote vehicle as determined from the positional characteristic data correlates with one of the estimated next potential segments as determined by vehicle dynamic data; and
determining that the positional characteristic data is not in compliance with a malicious node tampering parameter in response to the location of the remote vehicle as determined from the positional characteristic data not correlating with one of the estimated next potential segments.

12. The method of claim 9 wherein the characteristic data includes signal quality characteristic data of the remote vehicle, the method further comprising the steps of further comprising the steps of:
determining a signal quality characteristic of the wireless signal at the receiving device;
comparing the signal quality characteristic to a predetermined threshold range; and
determining that the wireless message transmitted by the remote vehicle is not in compliance with the malicious node tampering parameter in response to the signal quality characteristic being outside of the predetermined threshold range.

13. A vehicle-to-vehicle communication system for efficiently processing messages staged for authentication in a security layer of the protocol stack, the vehicle-to-vehicle communication system comprising:
a receiver for receiving incoming messages from remote vehicles;
a processing unit within the receiver for processing the incoming messages received by the receiver of a host vehicle; and
a protocol stack for executing a protocol for processing the received messages, the protocol stack including the security layer for authenticating a digital signature of the received message;
a filter for selectively processing a number of messages being staged for authentication in a security layer of the protocol stack, the filter discarding a respective wireless message prior to a transfer of the respective wireless message to the security layer in response to a determination that the wireless message transmitted by the remote vehicle is not in compliance with a predetermined parameter of the host vehicle.

14. The vehicle-to-vehicle communication system of claim 13 wherein the predetermined parameter is a path of travel of the host vehicle.

15. The vehicle-to-vehicle communication system of claim 14 further comprising a global positioning system receiver for receiving global positioning data of the host vehicle wherein a positional characteristic of the host vehicle is compared to a positional characteristic of the remote vehicle as obtained from the wireless message for determining whether the remote vehicle is on a same trajectory path as the host vehicle, wherein the wireless message transmitted by the remote vehicle is not in compliance with the path of travel of the host vehicle in response to the determination that the remote vehicle is not on a same trajectory path as the host vehicle.

16. The vehicle-to-vehicle communication system of claim 14 wherein the processing unit of the receiver is configured to receive altitude characteristic data from an atmospheric pressure sensor of the host vehicle, wherein altitude data derived from the atmospheric pressure sensor is compared to altitude characteristic data obtained from the wireless message for determining whether the remote vehicle is at a substantially same altitude as the host vehicle, and wherein the wireless message transmitted by the remote vehicle is not in compliance with the path of travel of the host vehicle in response to the altitude of the host vehicle not being at a substantially the same altitude data of the remote vehicle.

17. The vehicle-to-vehicle communication system of claim 13 wherein the predetermined parameter is a malicious node tampering parameter of the wireless message.

18. The vehicle-to-vehicle communication system of claim 17 wherein the processing unit of the receiver data is configured to obtain signal quality characteristic data of the received wireless message, the signal quality characteristic data being compared to a predetermined threshold range, wherein the wireless message transmitted by the remote vehicle is indicative of malicious node tampering parameter if the signal quality characteristic is not in compliance with the predetermined threshold range.

* * * * *